United States Patent
Tulman

(10) Patent No.: US 6,710,775 B1
(45) Date of Patent: Mar. 23, 2004

(54) ANIMATION TECHNIQUE

(75) Inventor: Joshua P. Tulman, Jersey City, NJ (US)

(73) Assignee: JibJab Media, Inc., Manhattan Beach, CA (US)

( * ) Notice: Subject to any disclaimer, the term of this patent is extended or adjusted under 35 U.S.C. 154(b) by 541 days.

(21) Appl. No.: 09/595,654

(22) Filed: Jun. 16, 2000

(51) Int. Cl.⁷ .............................. G06T 15/70
(52) U.S. Cl. .................. 345/473; 345/419; 345/427
(58) Field of Search ................. 345/427, 419, 345/473, 629

(56) References Cited

U.S. PATENT DOCUMENTS

| | | | |
|---|---|---|---|
| 5,870,099 A | 2/1999 | Horii et al. | |
| 5,990,900 A | * 11/1999 | Seago | 345/427 |
| 6,002,405 A | * 12/1999 | Berroteran | 345/419 |
| 6,046,745 A | 4/2000 | Moriya et al. | |
| 6,124,859 A | * 9/2000 | Horii et al. | 345/427 |
| 6,329,994 B1 | * 12/2001 | Gever et al. | 345/473 |

* cited by examiner

*Primary Examiner*—Mark Zimmerman
*Assistant Examiner*—Scott Wallace
(74) *Attorney, Agent, or Firm*—Trop, Pruner & Hu, P.C.

(57) ABSTRACT

A method for producing an animation of an object includes displaying an object on a display of a computer system. A perspective system that has a predefined relationship with the object is created on the display. The perspective system defines different planes, and different portions of the object are associated with the different planes. Each of these different portions is stored as a different image file. The perspective system is rotated about the object to establish different frames of the animation. For each frame, the different portions of the object are manipulated to orient the object to establish the predefined relationship with the rotated perspective system. For each frame, script is created describing the manipulation of the different portions of the object.

19 Claims, 8 Drawing Sheets

ANIMATION TECHNIQUE

BACKGROUND

The invention generally relates to an animation technique.

For purposes of producing a computer-generated animation of a real world object, typically, several photographs of the object must be taken. These photographs, in turn, are converted into digital images that a computer displays in successive frames to create the appearance that the object is moving or rotating. Thus, to simulate the rotation of the object about a particular axis, several photographs of the object may be taken (by a digital camera, for example) from various positions about the axis of rotation to create several corresponding digital images. The computer may individually display the images in successive frames to create the appearance that the object is rotating.

The above-described animation technique typically requires a large amount of data. For example, each digital image of the object may require approximately one hundred kilobytes of data that describes the various pixel intensities of the image. Therefore, if the computer displays ten images to animate rotation of a particular object, approximately one megabyte of data (one thousand kilobytes) may be required. Unfortunately, this large amount of data consumes a considerable amount of bandwidth when communicated across a network, such as the Internet, for example. The need for a large bandwidth, in turn, restricts a web site's ability to use the animation, as the large bandwidth requirement may limit the speed at which the animation may be accessed by a client of the web site.

Thus, there is a continuing need for an animation technique that addresses one or more of the problems that are stated above.

SUMMARY

In an embodiment of the invention, a method for producing an animation of an object includes displaying the object on a display of a computer system. A perspective system that has a predefined relationship with the object is created on the display. The perspective system defines different planes, and different portions of the object are associated with the different planes. Each of these different portions is stored as a different image file. The perspective system is rotated about the object for purposes of establishing different frames of the animation. For each frame, the different portions of the object are manipulated to reorient the object to establish the predefined relationship with the rotated perspective system. For each frame, script is created describing the manipulation of the different portions of the object.

Other features and advantages of the invention will become apparent from the following description drawing and claims.

DETAILED DESCRIPTION

Figure 1:
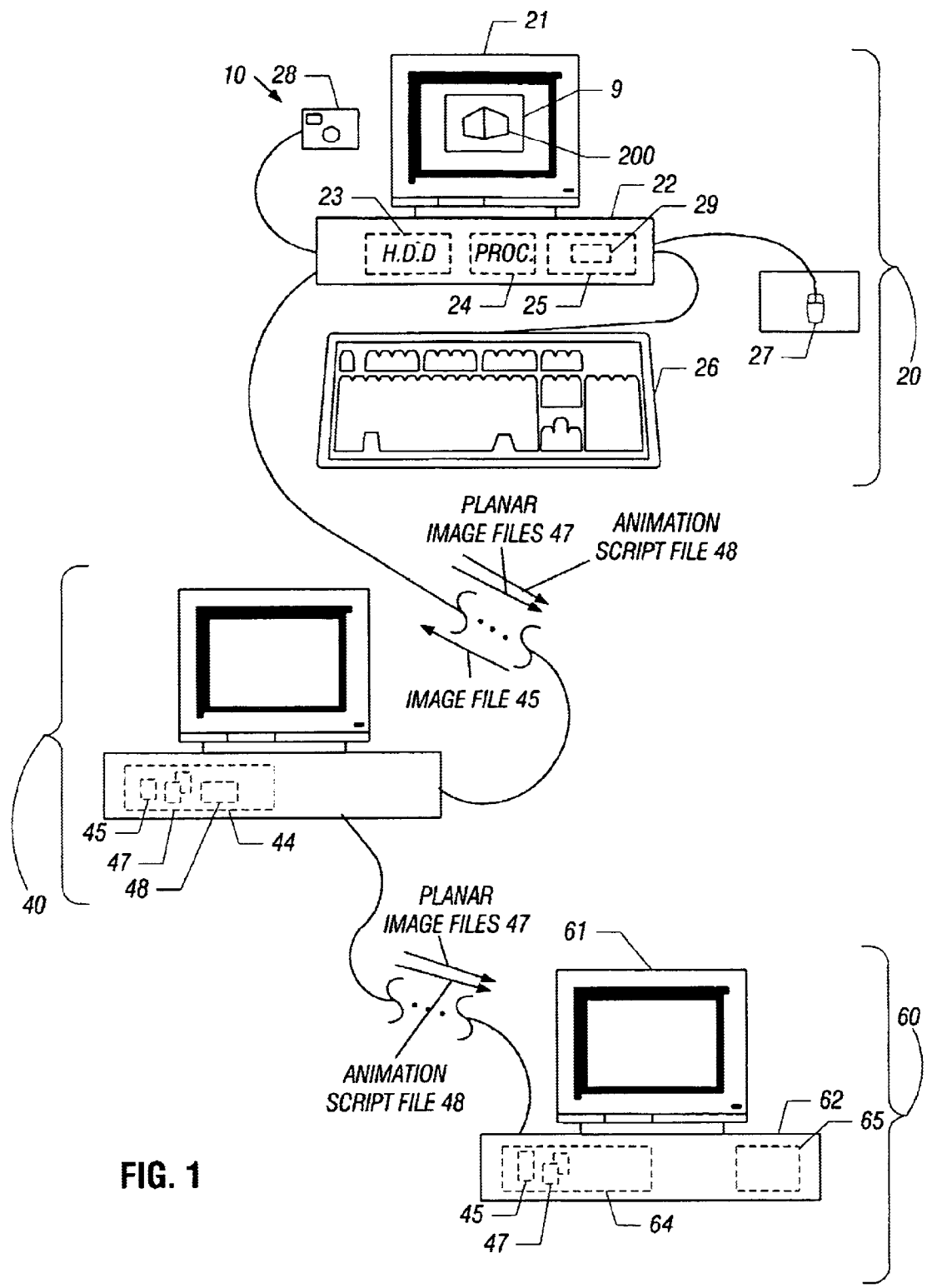
FIG. 1 is a schematic diagram of a network of computer systems according to an embodiment of the invention.

Referring to FIG. 1, an embodiment 10 of a computer network in accordance with the invention includes an animation workstation 20 that may be used by a user of the workstation 20 to develop animation data. This animation data, in turn, may be received and used by a client computer system 60 (of the network 10) to produce images to create the animation. For example, the animation may depict the rotation of an object. As described below, the animation data may be produced using an animation technique that reduces the size of the animation data relative to conventional animation data, thereby requiring less bandwidth to store and communicate the animation data.

More particularly, in some embodiments of the invention, the animation workstation 20 includes a display 21 for displaying objects to be animated. For example, the display 21 may display a two-dimensional (2-D) image 9 (a digital image produced by a digital camera or derived by scanning a photograph photographic image, as examples) that includes an object 200 to be animated. For purposes of producing the 2-D image 9, the workstation 20 may open an image file 45 that indicates the different pixel intensities of the 2-D image 9. The workstation 20 may receive the image file 45 from a server computer system 40, such as an Internet web server, for example. Alternatively, the workstation 20 may receive the image file 45 from another computer system, a diskette, a CD-ROM, a DVD disk or a peripheral device (such a digital camera 28, for example), as just a few examples.

The workstation 20 includes basic hardware to form the image 9, such as the display 21 and a computer unit 22 that generates display signals to drive the display 21. The computer unit 22 includes a processor 24 (one or more microprocessors, for example) that executes an animation development program 29 that, in turn, may be stored in a memory 25 (a random access memory (RAM), for example) of the computer unit 22. In this manner, when the processor 24 executes the program 29, the user may control the execution of the program 20 to cause the processor 24 to open the image file 45 so that the display 21 displays the 2-D image 9. As examples, the program 29 may be Photoshop® or Illustrator®, both of which are made by Adobe®; and Flash® that is made by Macromedia®. Other programs may be used.

The user, pursuant to the animation technique that is described herein, uses input devices, such as a mouse 27 and a keyboard 26, to control execution of the program 29, a control that may be used to manipulate various graphical images on the display 21, create graphical images on the display and initiate the storage and retrieval of data, as described below. More specifically, the user may control execution of the program 29 as described herein to cause the processor 24 to produce planar image files 47 and an animation script file 48. As described in more detail below, each planar image file 47 describes a portion (also called a planar image here) of the object 200 taken from a particular visible cubical plane of the object 200. The animation script file 48 describes the transformations and movements of the images (described by the various planar image files 47) for each frame of an animation. As will become apparent below, the creation of the planar image files 47 substantially reduces the number of images files that may otherwise be required to animate rotation of the object 200. Therefore, far less bandwidth may be consumed to communicate the animation data (i.e., the planar image files 47 and animation script file 48) to another computer system than is consumed by the communication of animation data that is created by a conventional animation technique.

For purposes of creating and storing the planar image files 47 and the animation script file 48 on the workstation 20, the workstation 20 includes mass storage. For example, this mass storage may include a hard disk drive 23 that store, as examples, copies of the planar image files 47, the animation script file 48 and the program 29.

In some embodiments of the invention, the server computer system 40 may be an Internet web server that furnishes an Internet web site that may, in turn, be accessed by the client computer system 60. In this manner, the client computer system 60 may execute an Internet browser program (Internet Explorer® made by Microsoft® or Navigator® made by Netscape®, as examples) that has a plug-in (a Flash® or Shockwavee® plug-in (both of which are made by Macromedia®), as examples) that allows the client computer system 60 to produce an animation video (on its display 61) after the client computer system 60 downloads the files 47 and 48 from the server computer system 40. The client computer system 60 may store the planar image files 47 and the animation script file 48 on a hard disk drive 64 or a memory 65 (a random access memory (RAM), for example) of the computer system 60.

As an example, the server computer system 40 may include a mass storage subsystem 44 (a redundant array of inexpensive disk (RAID) system, for example) that stores copies of the planar image files 47 and the animation script file 48 after the workstation 20 communicates these files 47 and 48 to the server computer system 40. The mass storage subsystem 44 may also store a copy of the 2-D image file 45.

Figure 2:
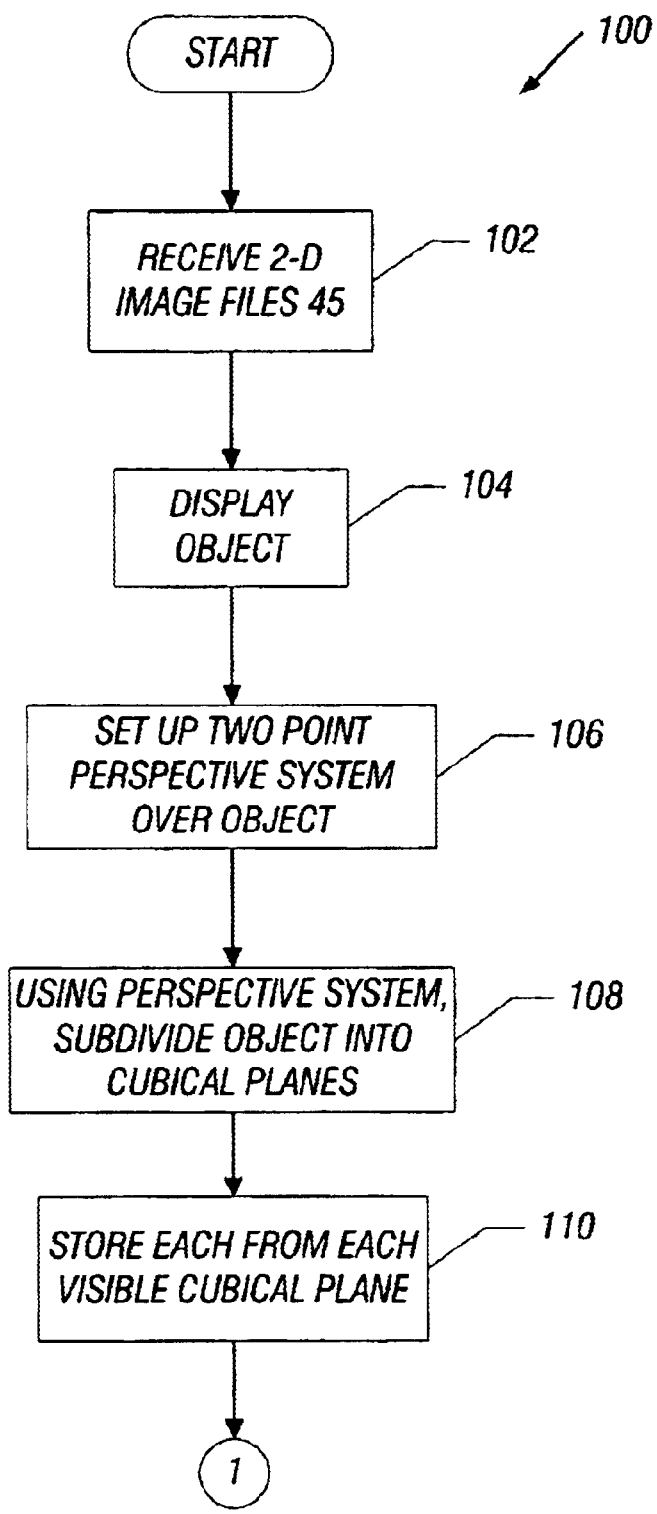
FIGS. 2, 3, and 4 depict a flow diagram illustrating an animation technique according to an embodiment of the invention.
Figure 3:
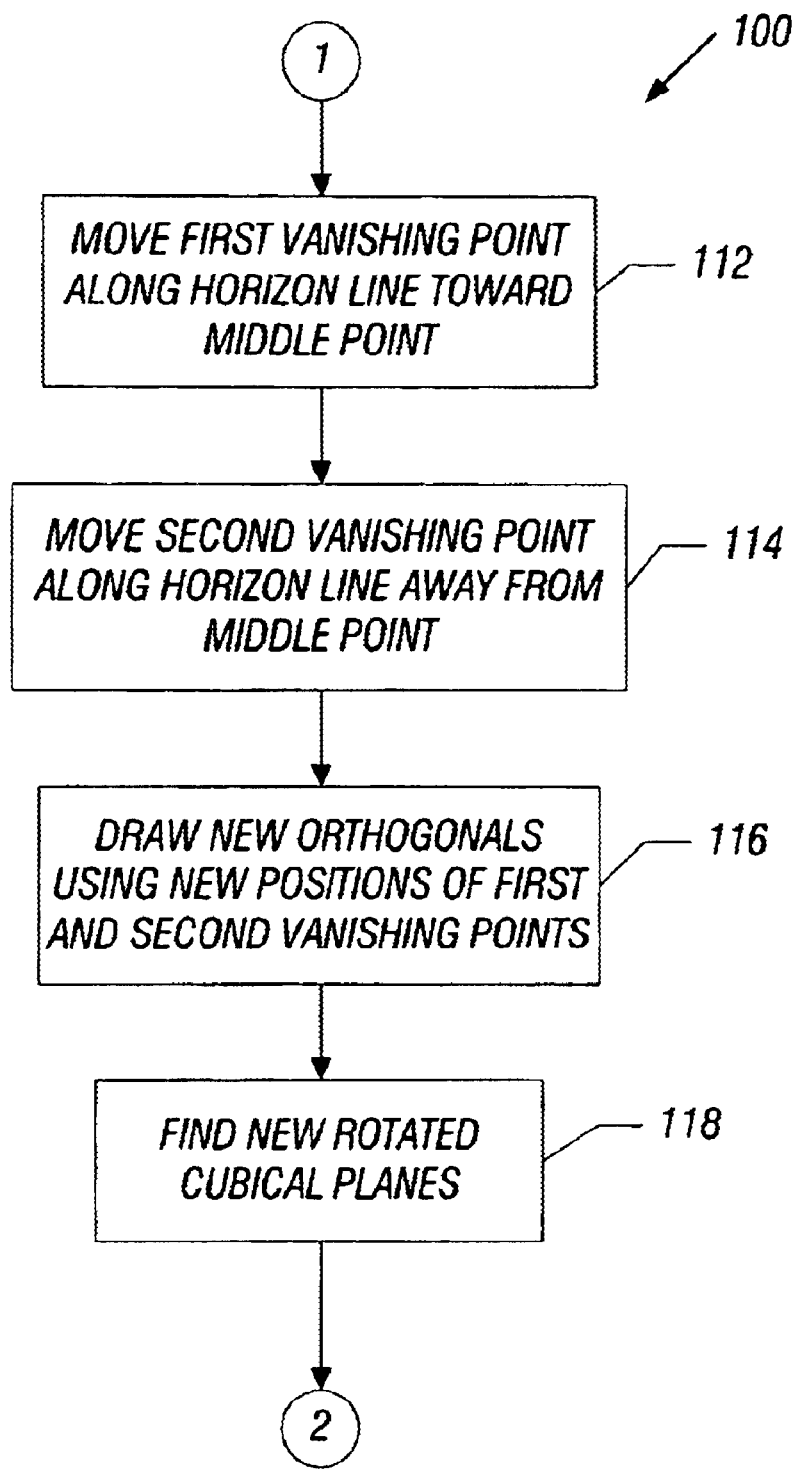
Figure 4:
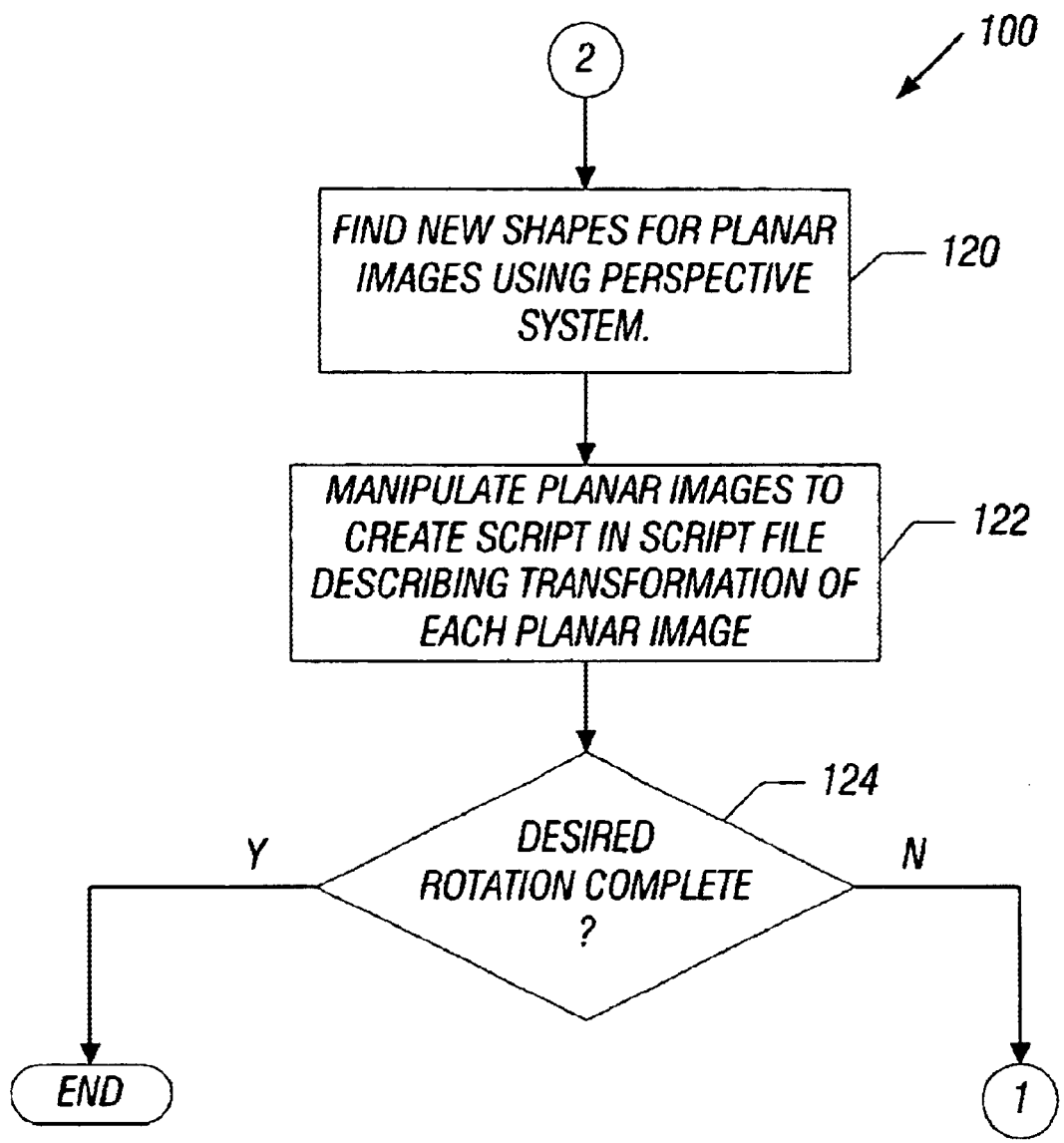

FIGS. 2, 3 and 4 depict an animation technique 100 that may be used to produce the planar image files 47 and the animation script file 45 to animate rotation of the object 200 in accordance with an embodiment of the invention. For purposes of simplifying the following description, animation of the object 200 is described, although other objects (not shown) of the image 9 or other images may be animated in a similar manner. Furthermore, the object 200 is depicted as a simple geometrical shape for purposes of clarifying the operation of the technique 100. However, the principles described herein also apply to more complex objects. In some embodiments of the invention, the animation technique that is described herein is performed when the workstation 20 is executing the program 29.

Figure 5:
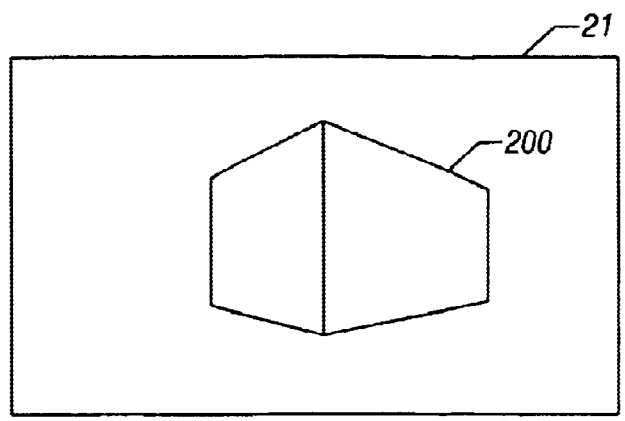
FIGS. 5, 6, 7, 8, 9, 10 and 11 depict images displayed by a computer system of FIG. 1 during use of the animation technique that is depicted in FIGS. 2, 3 and 4 according to an embodiment of the invention.
Figure 6:
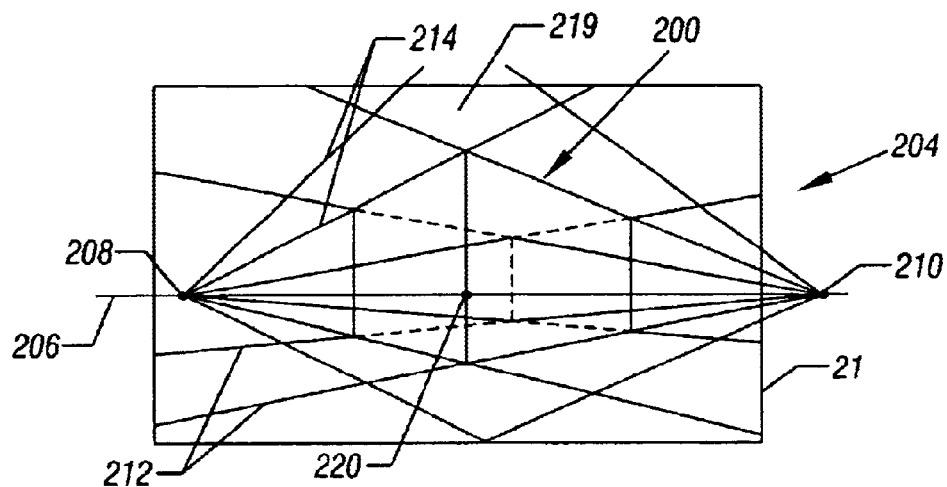

In the technique 100, the workstation 20 first receives (block 102) the 2-D image file 45 from the server computer system 40 or another source, as described above. Next, the workstation 20 displays (block 104) the object 200 that is described by the 2-D image file 45, as depicted in FIG. 5. This step may involve the user opening the 2-D image file 45 and erasing the remaining portion (of the 2-D image 9) that does not include the object 200 to be animated. Referring also to FIG. 6, the user subsequently sets up (block 106 of FIG. 2) a two point perspective system 204 over the object 200 by controlling execution of the program 29 to cause the workstation 20 to generate and display the various lines and points that are described below. The perspective system 204 may be partially displayed on the display 21, with the remaining portion of the perspective system 204 being viewable by panning a viewing window (not shown) that is established by the program 29.

The perspective system 204 includes vertical lines 219 that, as their name implies, extend vertically across the display 21 and a horizon line 206 that is orthogonal to the vertical lines 219 and extends through the object 200. A middle point 220 of the perspective system 204 is formed on the horizon line 206 at approximately a midpoint between a first vanishing point 210 and a second vanishing point 210. The first vanishing point 208 is located on the horizon line 206 to the left of the middle point 220, and the second vanishing point 210 is located on the horizon line 206 to the right of the middle point 220. Orthogonal lines (often called "orthogonals") 214 (of the perspective system 204) extend through the first vanishing point 208 at various angles, and orthogonal lines 212 (of the perspective system 204) extend through the second vanishing point 210 at various angles.

Figure 7:
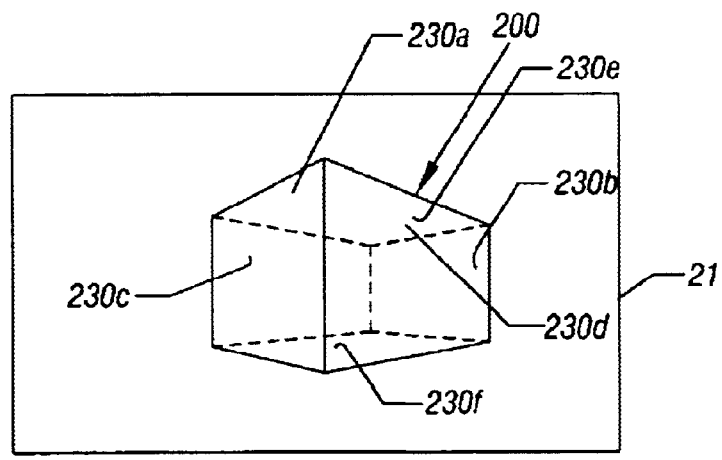

Still referring also to FIG. 2, after the perspective system 204 is established, the technique 100 includes using (block 108) the perspective system 204 to subdivide the object 200 into cubical planes. For example, FIG. 7 depicts six possible cubical planes 230a, 230b, 230c, 230d, 230e and 230f that may be used to subdivide the image of any object. Each cubical plane is defined by orthogonal lines and possibly the vertical lines of the perspective system 204. For example, the parallel cubical planes 230a and 230b are formed by the orthogonal lines 214 and the vertical lines 219. The parallel cubical planes 230c and 230d are formed by the orthogonal lines 212 and the vertical lines 219. The parallel cubical planes 230e and 203d are formed by the orthogonals 212 and 214. As shown in the 2-D image 9, the object 200 has two visible cubical planes: cubical planes 230a and 230b. The remaining cubical planes 230c, 230d, 230e and 230f are invisible for the example that is described herein. One or more of the cubical planes 230c, 230d, 230e and 230f may be visible for different objects. Furthermore, one or both of the cubical planes 230a and 230b may be invisible for different objects.

Figure 8:
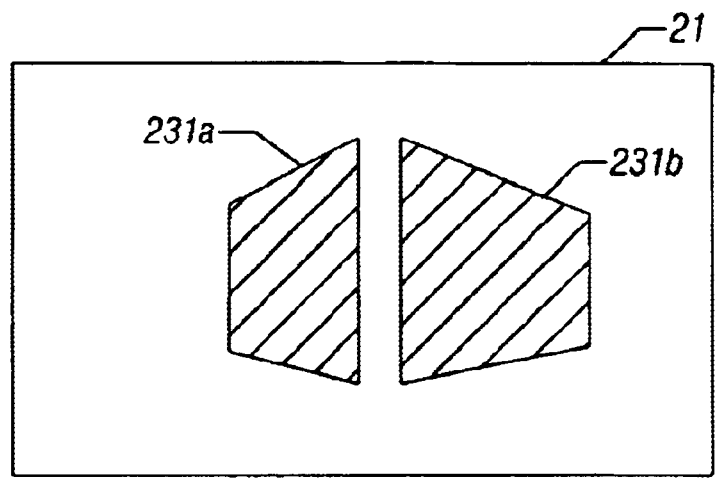

After the object 200 is subdivided into the cubical planes, the portions (of the object 200) that lie in the visible cubical images are stored (block 110 of FIG. 2) as separate planar image files. For example, FIG. 8 depicts two such planar images: a planar image 231 a that corresponds to the portion (of the object 200) that resides in the cubical plane 230a and a planar image 231b that corresponds to the portion (of the object 200) that resides in the cubical plane 230b. The images may or may not have a rhombic geometrical shape, as depicted in FIG. 8 for purposes of simplifying description of the technique 100.

It is noted that a particular object to be animated may be visible in one or more cubical planes. The choice for the axis of rotation and the degree in which different planar portions of the object is visible affect the angle through which the object is rotated using the technique 100.

Thus, each image that is associated with a visible cubical plane is stored in a separate planar image file 47 (see FIG. 1). After the step 110, the number of planar image files 47 is fixed, regardless of the number of frames in the rotation and the angle through which the object 200 is rotated. Thus, for the example that is depicted by the object 200, two planar image files 47 are created and stored in the hard disk drive 23 of the workstation 20. This is to be compared to conventional arrangements in which a substantially greater number of image files are created to depict the object at various positions about the axis of rotation. Unlike these conventional arrangements, the number of image files is small, with the transformations and movements of the described images being directed by the animation script file 48.

Therefore, the remaining part of the technique 100 involves generating the animation script file 48. For the example depicted herein, the technique 100 describes rotation about a vertical axis. However, another axis of rotation may be used in other embodiments of the invention.

Figure 9:
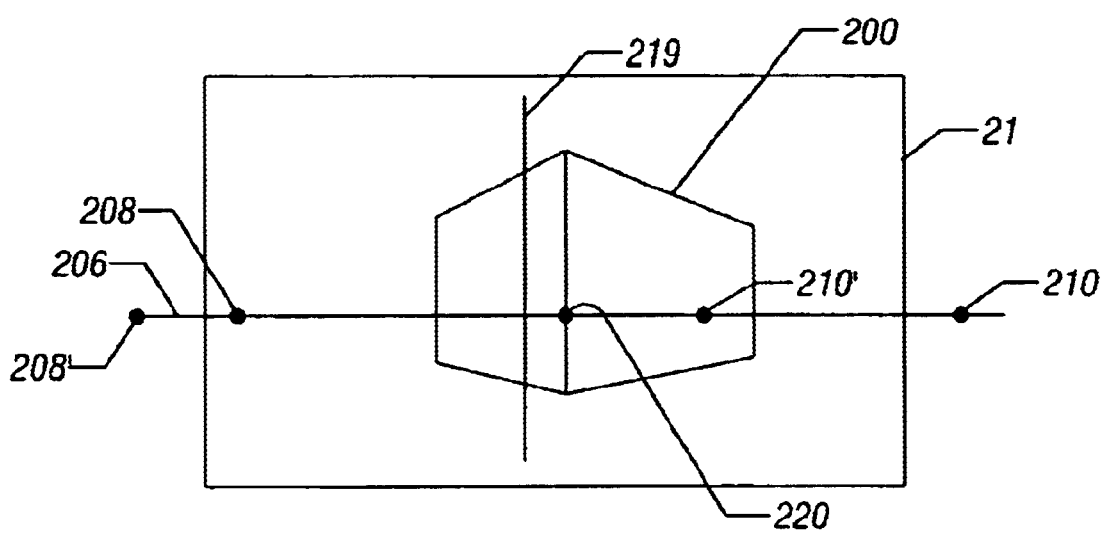

Referring to FIG. 3, for purposes of generating the animation script file 48, the technique 100 includes rotating the perspective system 204 and thereafter manipulating the planar images to reorient the object 200 with respect to the rotated perspective system 204. In this manner, referring also to FIG. 9, the user of the workstation 20 controls the execution of the program 29 to move (block 112) the first vanishing point 208 along the horizon line 206 toward the middle point 220 to create a new first vanishing point 208' and move (block 114) the second vanishing point 210 along the horizon line 206 away from the middle point 220 to create a new second vanishing point 210'. In some embodiments of the invention, the user moves the second vanishing point 210 farther than the first vanishing point 208. For example, the distance in which the second vanishing point 210 is moved may be a multiple of the distance in which the first vanishing point 208 is moved.

Figure 10:
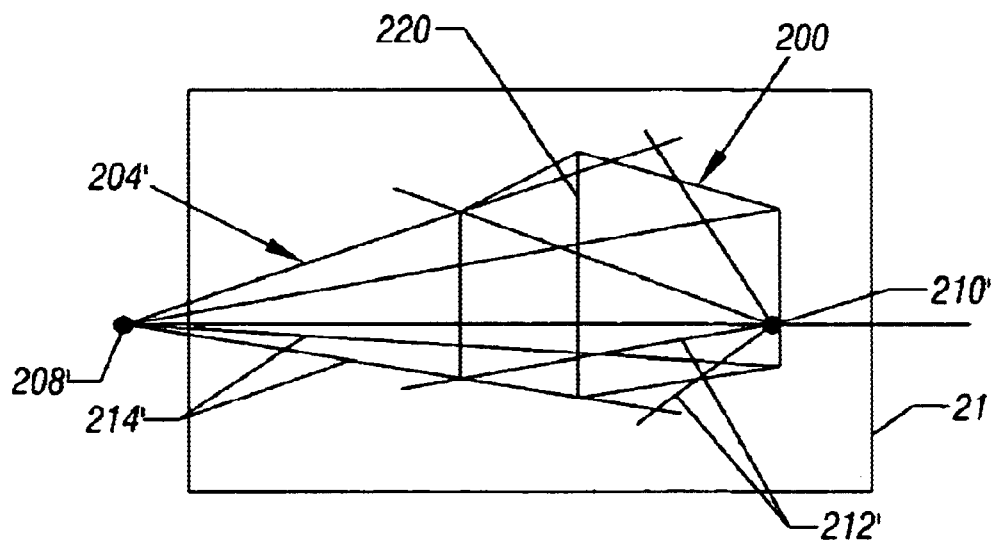

After moving the first 208 and second 210 vanishing points, the user of the workstation 20 then controls the execution of the program 29 to draw (block 116) new orthogonal lines 214' through the first vanishing point 208' and new orthogonal lines 212' through the second vanishing point 210' to establish a new two point perspective system 204' (as depicted in FIG. 10), that is effectively a rotated version of the perspective system 204. As shown in FIG. 10, when the user establishes the new perspective system 204' the planar images 231a and 231b are not aligned with the cubical planes that are established by the perspective system 204', as the movement of the first 208 and second 210 vanishing points rotated the cubical planes.

Figure 11:
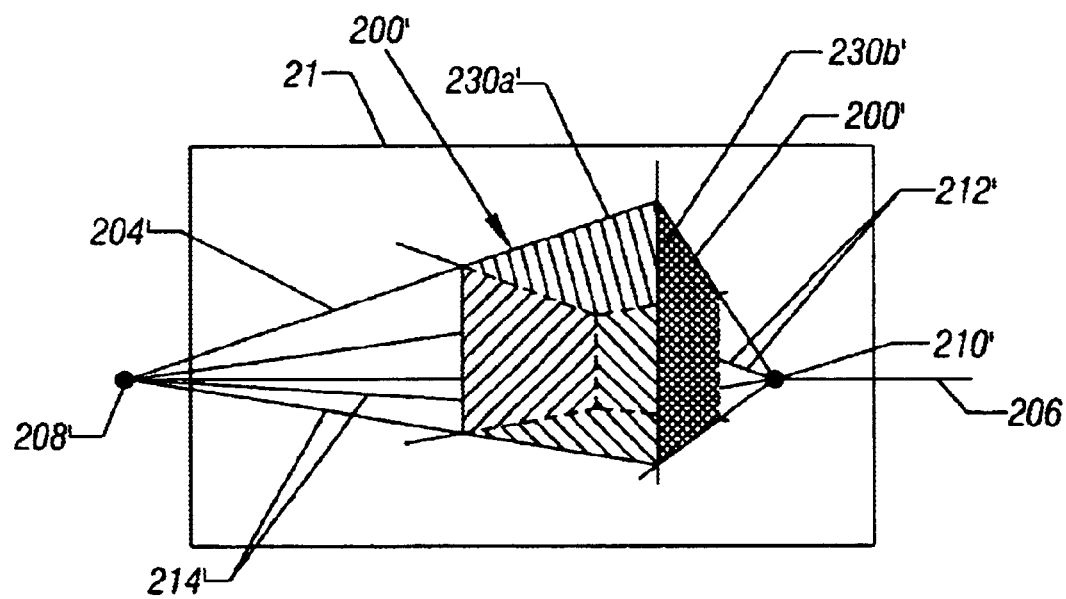

Therefore, the user finds (block 118) the new rotated cubical planes. The object is to find (block 120) new shapes for the planar images so that each planar image lies in its associated rotated cubical plane. The user may accomplish this by controlling the execution of the program 29 to perform such graphical functions as scaling, skewing and movement of the original planar images 231a and 231b to create new planar images 231a' and 231b' (see FIG. 11), respectively, that lie in their respective rotated cubical planes. At this point, new planar image files are not created. Instead, the manipulation of the planar images by the user causes the workstation 20 (while executing the program 29) to create (block 122) new script in the animation script file 48 that describes the transformations and movements (of the planar images 231a and 231b in the initial frame) that are needed to form the planar images 231a' and 231b' of the second frame of the animation.

The script for the subsequent frames of the animation may be created in a similar manner. Thus, the technique 100 includes determining (diamond 124) whether the desired rotation has been completed. If so, the technique 100 ends. Otherwise, if the script for more rotation is to be created, then the technique 100 returns to block 112 to begin changing the current two point perspective system to further rotate the object.

Figure 12:
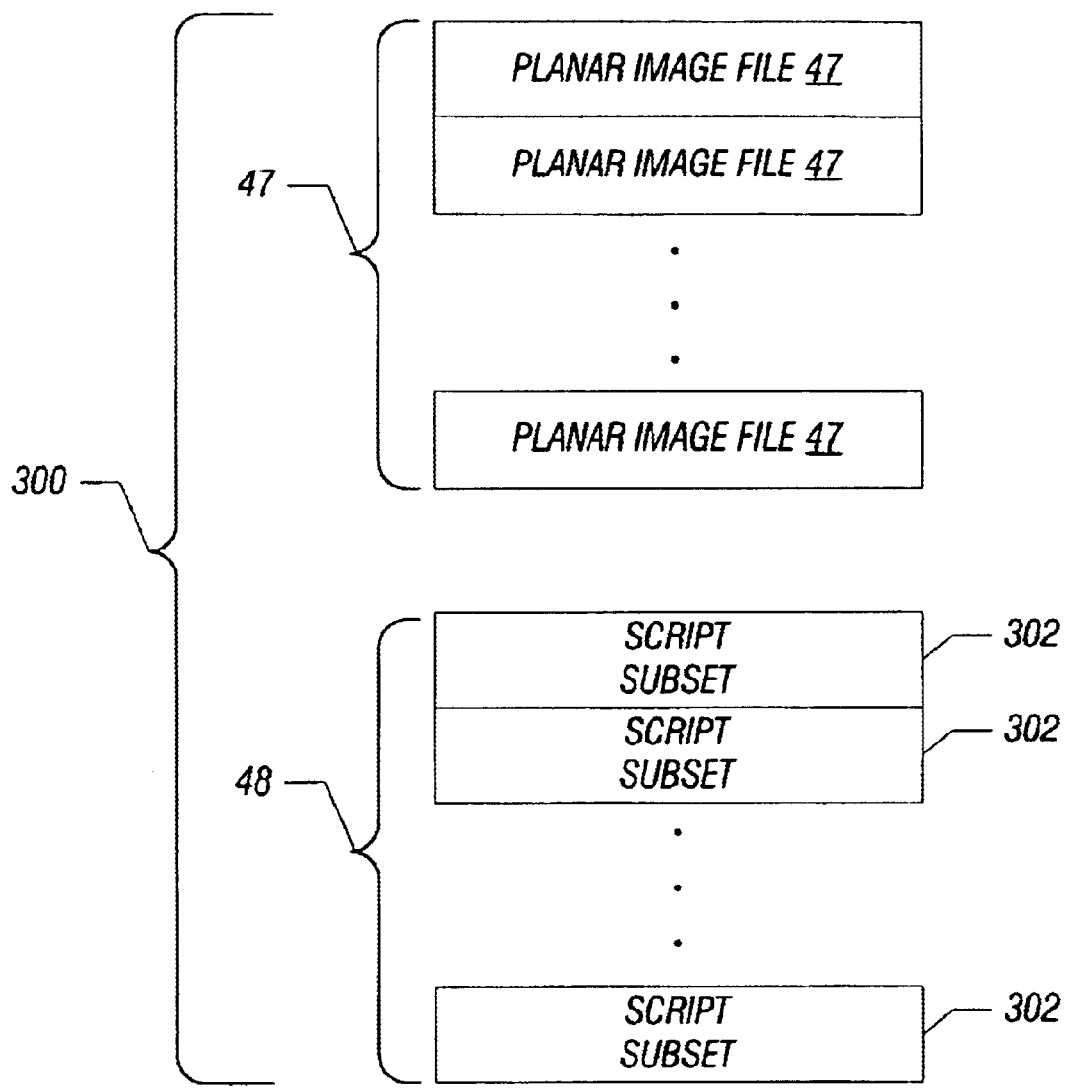
FIG. 12 is a schematic diagram of animation data created by the animation technique according to an embodiment of the invention.

In summary, the above-described technique 100 generates animation data 300 that is depicted in FIG. 12. This animation data 300 includes the planar image files 47, one planar image file 47 for each planar image that is visible from the 2-D object 200. Thus, depending on the visual characteristics of the object, up to six planar image files 47 may be created using the technique 100. The animation data 300 also includes the animation script file 48 that describes the movements and transformations of the planar images for each frame of the animation. In this manner, the animation script file 48 includes script subsets 302, each of which is associated with a frame of the animation and describes the transformations and movements of the planar images 47 needed to achieve the images of the associated frame. Thus, it can be appreciated by those skilled in the art that a subset of script data for each additional frame consumes far less storage space and bandwidth than an image file for each position of the image. The animation data 300 may be stored in a hard disk drive, a CD-ROM, a random access memory (RAM), a disk drive or a tape drive, as just a few examples of the storage mediums that may be used.

In the preceding description, directional terms, such as "vertical," "horizontal," etc., may have been used for reasons of convenience to describe the perspective system, the animated object and the animation technique. However, such orientations are not needed to practice the invention, and thus, other orientations are possible in other embodiments of the invention.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method comprising:

displaying an object on a display of a computer system;

creating a first perspective system on the display, the first perspective system including vanishing points and establishing a first set of different planes;

associating different portions of the object with the different planes;

storing each different portion as a different image file;

moving the vanishing points to form at least one additional perspective system, each of said at least one additional perspective system defining an associated set of different planes;

for each of said at least one additional perspective system, manipulating the different portions of the object so that each different portion of the object lies in one of the planes associated with the additional perspective system; and for each of said at least one additional perspective system, creating script describing the manipulation of the different portions of the object.

2. The method of claim 1, wherein the act of moving the vanishing points comprises:

moving a first vanishing point of one of the first and additional perspective systems toward a middle point of said one of the first and additional perspective systems and moving a second vanishing point away from the middle point.

3. The method of claim 2, wherein the first vanishing point is moved a shorter distance than the second vanishing point.

4. The method of claim 1, wherein the planes defined by the first perspective system and said at least one additional perspective system comprise cubical planes.

5. The method of claim 1, wherein the planes defined by the first perspective system and said at least one additional perspective system comprise planes in which the portions of the objects are visible.

6. The method of claim 1, further comprising:

communicating the script and the different image files to another computer system.

7. The method of claim 1, further comprising:

communicating the script and the different image files across a network.

8. The method of claim 1, wherein the act of manipulating comprises:

scaling the portions.

9. The method of claim 1, wherein the act of manipulating comprises:

skewing the portions.

10. The method of claim 1, wherein the act of creating the script comprises:

storing the script.

11. An article comprising a computer readable storage medium storing data comprising:

image files, each different image file to cause a computer to display a different portion of a first frame of an object, each different portion lying in a different plane of a first perspective system associated with the first frame; and an animation script file comprising subsets, each subset being associated with a different frame subsequent to the first frame, each different frame being associated with a different additional perspective system and for each frame, each subset to cause the computer to manipulate the displayed portions so that the portions lie in different planes of the associated different additional perspective system to animate rotation of the object.

12. The article of claim 11, wherein the planes associated with the first perspective system and said the different additional perspective systems comprise cubical planes.

13. The article of claim 11, wherein the planes associated with the first perspective system and said different additional perspective systems comprise planes in which the portions of the object are visible.

14. The article of claim 11, wherein the manipulation comprises scaling the portions.

15. The article of claim 11, wherein the manipulation comprises skewing the portions.

16. A method for producing an animation of an object, comprising:

displaying an object on a display of a computer system;

creating a perspective system on the display that has a predefined relationship with the object, the perspective system defining different planes;

associating different portions of the object with the different planes;

storing each portion as a different image;

rotating the perspective system about the object to establish different frames of the animation;

for each frame, manipulating the different portions to orient the object to establish the predefined relationship with the rotated perspective system; and for each frame, creating script describing the manipulation of the different portions of the object.

17. The method of claim 16, wherein the act of rotating the perspective system comprises:

moving vanishing points of the perspective system.

18. The method of claim 16, wherein the predefined relationship comprises:

a relationship between planes of the perspective system and the portions of the object.

19. The method of claim 16, further comprising:

communicating the script and the different image files to another computer system.

* * * * *